United States Patent [19]

Ng

[11] 4,443,876

[45] Apr. 17, 1984

[54] FAST PARITY GENERATION FOR FIND LOW ORDER ZERO CIRCUIT

[75] Inventor: Ying-Wah Ng, Lisle, Ill.

[73] Assignee: Bell Telephone Laboratories, Incorporated, Murray Hill, N.J.

[21] Appl. No.: 298,079

[22] Filed: Aug. 31, 1981

[51] Int. Cl.³ .............................................. G06F 11/00
[52] U.S. Cl. ......................................... 371/49; 371/51
[58] Field of Search ...................... 371/49, 51; 364/715

[56] References Cited

U.S. PATENT DOCUMENTS

| | | | |
|---|---|---|---|
| 3,531,631 | 9/1970 | Burgess | 371/51 |
| 3,555,255 | 1/1971 | Toy | 371/49 |
| 3,571,580 | 3/1971 | Buchan et al. | 364/715 |
| 3,678,259 | 7/1972 | Kyser | 364/715 |
| 3,944,800 | 3/1976 | Beck et al. | 371/51 |

OTHER PUBLICATIONS

Signetics, Logic, Memories, Interface, Analog, Microprocessor, Military, Data Manual, 1976 pp. 138, 145, 183.

*Primary Examiner*—Jerry Smith
*Assistant Examiner*—Michael R. Fleming
*Attorney, Agent, or Firm*—J. W. Herndon; S. J. Phillips

[57] ABSTRACT

Parity for the address of a low order zero in an input data word is generated directly from the input data rather than from the address of the low order zero. A find low order zero circuit (11) generates an address of the low order zero in the data word. Simultaneously with this operation a parity generating circuit (12) operates on the input data word to generate parity for the low order zero address. The parity generating circuit comprises a plurality of individual circuits (30 through 33) each of which operates on a different byte of the input data word. The individual circuits each generate a control signal ($E_a, E_b$...) according to whether or not its byte contains a low order order zero, and a result signal ($R_a, R_b$...) which represents the parity of the address of the low order zero, if any, in the byte taking into account the byte position in the input data word. Logic circuitry combines the control and result signals to form the overall parity for the low order zero address.

8 Claims, 7 Drawing Figures

CIRCUIT 30, 33

CIRCUIT 31

CIRCUIT 32

4,443,876

FAST PARITY GENERATION FOR FIND LOW ORDER ZERO CIRCUIT

This invention relates to computer circuits and, more particularly, to parity generation circuits.

A find low order zero (FLZ) circuit finds utility in the digital computer art. For example, in an automatic priority interrupt system, a number of competing interrupt requests can be prioritized with an FLZ circuit by identifying an interrupt source with its bit position in an interrupt data word. In an electronic telephone switching system, an FLZ circuit can be used to scan incoming lines for service requests. In computer arithmetic circuits, a floating point number can be normalized by adjusting the exponent and shifting the fraction by a number of bit positions equal to the number of leading zeroes. The bit position of the high order one can be determined using an FLZ circuit.

Examples of FLZ circuits will be found in U.S. Pat. No. 3,571,580, issued to J. S. Buchan et al. and U.S. Pat. No. 3,678,259, issued to L. T. Kyser.

In various embodiments, the FLZ circuit may be used to locate either the most significant or the least significant data bit equal to either one or zero. The terms "least significant", "most significant", "one", and "zero" are arbitrary designations and apply to the end result intended by the computer designer. Accordingly, these terms may be interchanged throughout the present specification and claims without limiting the scope of the invention.

The FLZ circuit produces a binary address that represents the offset of the low order zero appearing in an applied data word. In order to provide for error detection and correction features, it is desirable to generate a parity bit for this address data. The usual prior art technique is a parity generation circuit responsive to the output address generated by the FLZ circuit. This has the undesirable effect of adding the delay inherent in the parity generation circuit to the delay inherent in the FLZ circuit. For high-speed operation, it is desirable to derive the FLZ address parity directly from the information on the input data bus concurrently with the operation of the FLZ circuit. The address bits and the parity bit are then available at the same time without cascading the delays of the two circuits.

SUMMARY OF THE INVENTION

The present invention generates parity for the address produced by a find low order zero (FLZ) circuit in parallel with the operation of the FLZ circuit by calculating the parity of the address in a novel manner. The total plurality of input bits that comprise the input data word is subdivided into several subfields, or bytes, each comprising a number of sequential data bits. A separate circuit is provided for each byte, which circuit produces two output signals. A first signal is the parity bit for the address of the low order zero appearing in the byte, which bit is generated taking into account the high order address bits that represent the offset of the byte in the input data word. A second output signal is asserted when there is no low order zero (that is, all ones) in the byte. The least significant byte having a low order zero is termed the "active" byte. Subsequent circuitry utilizes the outputs from the several byte parity generation circuits to select parity information from the active byte.

DETAILED DESCRIPTION

Figure 1:
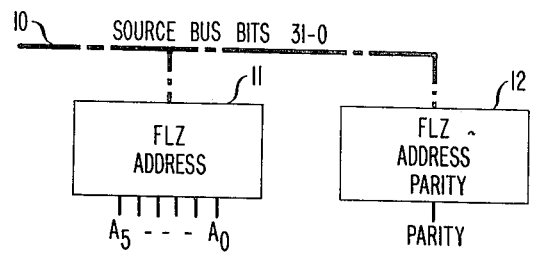
FIG. 1 shows a block diagram of the environment of the invention.

FIG. 1 shows the environment in which the present invention finds utility. Data bus 10 carries a data word of 32 bits in the present illustrative embodiment. Find low order zero (FLZ) address circuit 11 generates a 6-bit address $A_0$–$A_5$ which is the binary address of the least significant zero appearing on the data bus. In the present embodiment, the addresses vary from 000000 to 011111 as the low order zero varies from the least to most significant bit position. An all-ones condition on the data bus will produce an address of 100000. Concurrently with the operation of FLZ address circuit 11, FLZ address parity circuit 12 generates the parity bit of the address information $A_0$–$A_5$ directly from the data on the input bus.

Figure 2:
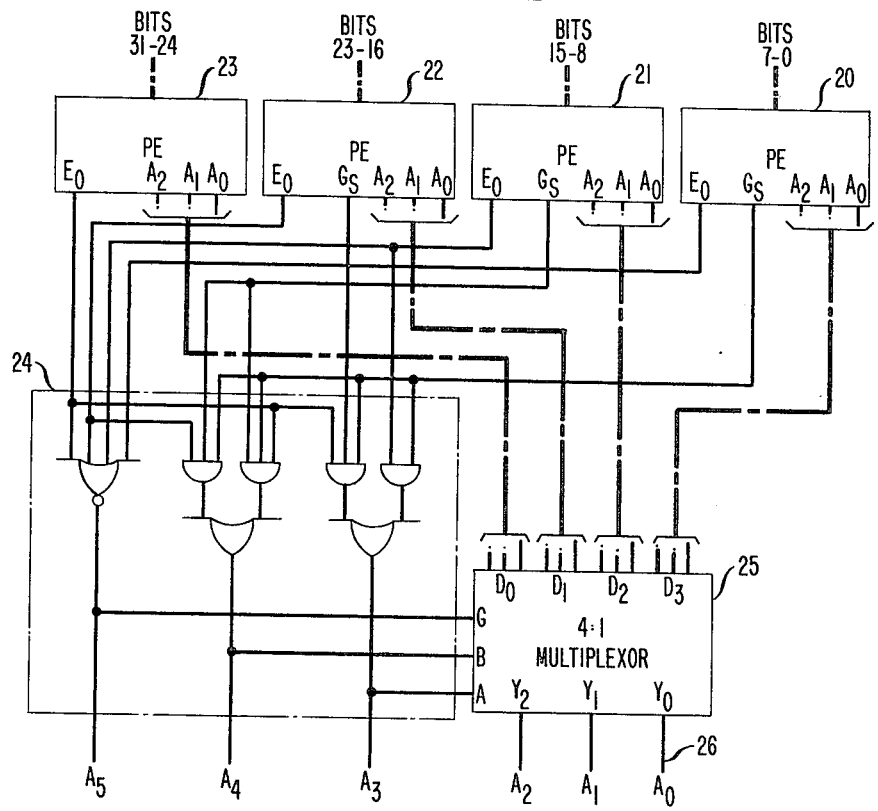
FIG. 2 shows an exemplary find low order zero (FLZ) circuit with which the present invention finds utility.

FIG. 2 shows an illustrative FLZ address circuit 11. The circuit of FIG. 2 forms no part of the present invention, but is shown as an aid to understanding the environment in which the present invention operates. The 32 bits of data bus 10 are separated into four 8-bit bytes, each byte being processed by one of the priority encoder circuits 20 through 23, respectively. A priority encoder circuit suitable for this use is the commercially available 74148 device described in the Signetics Corporation Data Manual (published 1976) at page 138. The 74148 priority encoder circuit produces a 3-bit address on output leads $A_0$–$A_2$ of the low order zero appearing on the eight input data leads. Output $E_0$ is a zero when the input bits are all ones and is a one otherwise. Output $G_S$ is the inversion of $E_0$. Gating circuit 24 combines the $G_S$ and $E_0$ outputs from priority encoders 20–23 to produce the high order address bits $A_3$–$A_5$. Bits $A_3$ and $A_4$ represent the address of the "active" byte, that is the byte having the low order zero of the 32-bit input data word.

The outputs $A_0$–$A_2$ of the active byte are selected by multiplexor 25 comprising three 74153 data multiplex circuits, shown at p. 145 in the Signetics manual. In response to the byte selection signals $A_3$ and $A_4$, one 74153 multiplex circuit gates one of the four $A_0$ inputs from circuits 20–23 onto output lead 26. Similarly, outputs $A_1$ and $A_2$ are selected. A one on bit $A_5$ indicates the all ones condition of the 32 input signals. This is used to disable all 74153 circuits, thus causing multiplexor 25 to produce zeroes on leads $A_0$–$A_2$.

Figure 3:
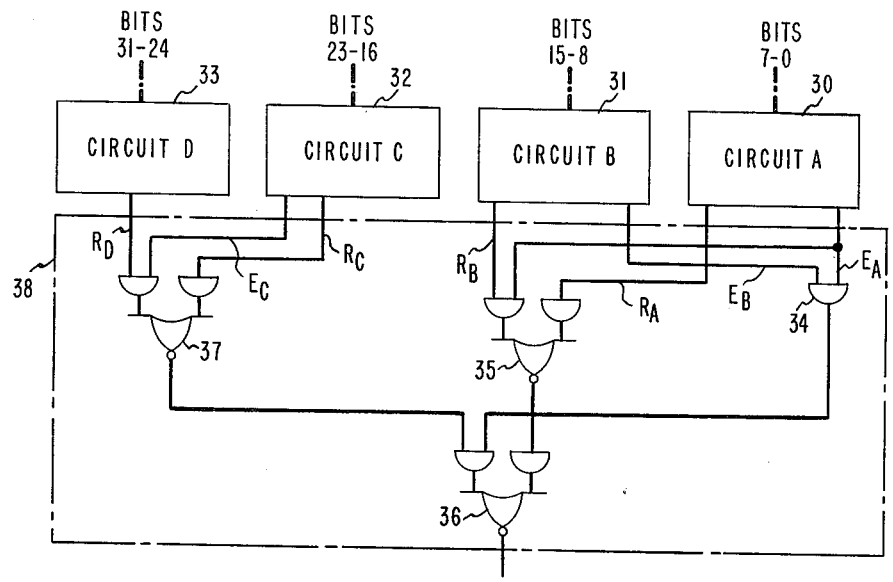
FIG. 3 is an illustrative embodiment of the present invention for a 32-bit input word divided into four 8-bit bytes.

FIG. 3 shows an embodiment of the present invention, the FLZ address parity generation circuit shown at 12 in FIG. 1. The 32 bits of the input data bus 10 are divided into four 8-bit bytes, each byte being processed by one of the circuits 30 through 33, respectively. Each of these circuits calculates the address parity (odd) for the low order zero appearing at its inputs, taken in combination with the high order address bits that represent the offset of the byte within the 32-bit data word. Thus, for circuit 30, address bits $A_3$ and $A_4$ are 00. Therefore, there is no contribution to the parity by these two bits. For circuit 31, the high order address bits are 01. Circuit 31, therefore, generates the inverse parity of the address bits of the low order zero appearing at its inputs. For circuit 32, the high order address bits are 10, and it similarly generates inverse parity. For circuit 33, the high order address bits are 11, and it generates normal parity.

The parities generated by circuits 30–33, respectively, are termed the "result" bits. One result bit (from the active byte) is selected by the circuitry at 38 as the overall output of FIG. 3. The result bits represent the true parity for the byte at the input of circuits 30 and 33, and inverse parity for the other circuits. The result bit produced by the byte with the low order zero is the true parity for the overall address. Each result bit output appears on the lead labeled $R_D$, $R_C$, $R_B$, and $R_A$, respectively.

Circuits 30–32 generate enable outputs $E_A$, $E_B$, and $E_C$. An enable output is in a first binary state (e.g., one) when inputs to the circuit are all ones. Otherwise, the enable output is zero.

When circuit 30 has a low order zero, $E_A$ output is zero, causing the output of AND gate 34 to be zero. The $R_A$ signal from circuit 30 proceeds through a path including NOR gates 35 and 36. The output of NOR gate 37 is inhibited by the action of AND gate 34. Thus, the parity information generated by circuit 30 is selected to be the output of the circuit of FIG. 3.

When the inputs to circuit 30 are all ones, but circuit 31 has a low order zero, outputs $E_A$, $R_A$, $E_B$, are respectively 1, 0, and 0. (Outputs $R_A$, $R_B$, $R_C$, and $R_D$ for the all ones condition have been specifically chosen to simplify the circuitry of FIG. 3 and to give the proper parity when the data bus is in the all ones condition. The selected states for these outputs will be shown in detail below.) In this situation, the output of AND gate 34 is a zero inhibiting the output from NOR gate 37. The output on $R_B$ is gated through a path including NOR gate 35 and NOR gate 36 to become the parity output of the circuit of FIG. 3.

When the inputs to circuits 30 and 31 are all ones, and the input to circuit 32 contains a low order zero, the outputs $E_A$, $R_A$, $E_B$, $R_B$, and $E_C$ are respectively 1, 0, 1, 1, 0. AND gate 34 has a 1 output, while NOR gate 35 has a 0 output. Thus, the information on $R_C$ is gated through a path including NOR gate 37 and NOR gate 36 to become the parity output of the circuit of FIG. 3.

When the inputs to circuits 30, 31, and 32 are all ones, and the inputs to circuit 33 contains a low order zero, the outputs $E_A$, $R_A$, $E_B$, $R_B$, $E_C$, and $R_C$ are respectively 1, 0, 1, 1, 1, 0. Thus, the output of AND gate 34 is a one, the output of NOR gate 35 is a zero, and the $R_D$ output is gated through a path including NOR gate 37 and NOR gate 36 to form the parity output of the circuit of FIG. 3.

When all inputs to circuits 30–33 are ones, the outputs of circuits 30–32 are as above, and the output $R_D$ is zero. The output of NOR gate 36 is zero, the correct parity for the address 100000.

The outputs of circuits 30–33 can be summarized in the following truth table, Table I, which shows, in the first column, input data bits $a_0$–$a_7$ for each of the possible positions of a low order zero appearing in that byte, plus the all ones condition. The second column contains the three address bits $A_0$–$A_2$, showing the binary values of the address bits that identify the position of the low order zero in the byte. The third column shows the states of the result bits $R_A$–$R_D$. The result bits appearing in the first eight rows represent the parity of the five address bits $A_0$–$A_4$. As previously noted, address bits $A_4A_3$ are 00 for $R_A$, 01 for $R_B$, 10 for $R_C$, and 11 for $R_D$. The ninth row shows the byte all ones condition. The value of $R_D$ in the ninth row represents the parity (0) for the condition when there are all ones on the input data bus which, by convention, generates an address of 100000. The values of $R_A$, $R_B$, and $R_C$ in the ninth row are not parity values, since there is no prescribed address bits $A_0$–$A_2$ for the byte all ones condition. The values of $R_A$–$R_C$ generated by circuits 30–32 were chosen to simplify the logic operations that serve to select the result data from circuits 30–33. The fourth entry in the table shows the states of the enable signals $E_A$–$E_C$ for each of the input bytes.

TABLE I

| Byte | | | | | | | | Address | | | Result | | | | Enable | | |
|---|---|---|---|---|---|---|---|---|---|---|---|---|---|---|---|---|---|
| $a_7$ | $a_6$ | $a_5$ | $a_4$ | $a_3$ | $a_2$ | $a_1$ | $a_0$ | $A_2$ | $A_1$ | $A_0$ | $R_D$ | $R_C$ | $R_B$ | $R_A$ | $E_C$ | $E_B$ | $E_A$ |
| — | — | — | — | — | — | — | 0 | 0 | 0 | 0 | 1 | 0 | 0 | 1 | 0 | 0 | 0 |
| — | — | — | — | — | — | 0 | 1 | 0 | 0 | 1 | 0 | 1 | 1 | 0 | 0 | 0 | 0 |
| — | — | — | — | — | 0 | 1 | 1 | 0 | 1 | 0 | 0 | 1 | 1 | 0 | 0 | 0 | 0 |
| — | — | — | — | 0 | 1 | 1 | 1 | 0 | 1 | 1 | 1 | 0 | 0 | 1 | 0 | 0 | 0 |
| — | — | — | 0 | 1 | 1 | 1 | 1 | 1 | 0 | 0 | 0 | 1 | 1 | 0 | 0 | 0 | 0 |
| — | — | 0 | 1 | 1 | 1 | 1 | 1 | 1 | 0 | 1 | 1 | 0 | 0 | 1 | 0 | 0 | 0 |
| — | 0 | 1 | 1 | 1 | 1 | 1 | 1 | 1 | 1 | 0 | 1 | 0 | 0 | 1 | 0 | 0 | 0 |
| 0 | 1 | 1 | 1 | 1 | 1 | 1 | 1 | 1 | 1 | 1 | 0 | 1 | 1 | 0 | 0 | 0 | 0 |
| 1 | 1 | 1 | 1 | 1 | 1 | 1 | 1 | — | — | — | 0 | 0 | 1 | 0 | 1 | 1 | 1 |

Figure 4:
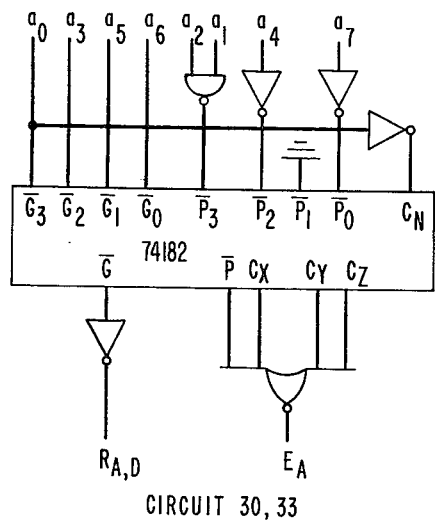
FIGS. 4, 5, and 6 show circuit details for use with the embodiment of FIG. 3.
Figure 5:
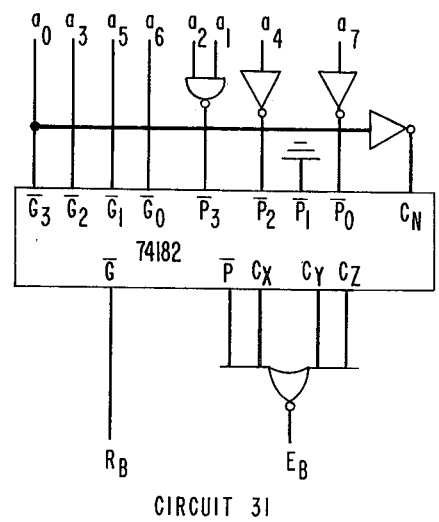
Figure 6:
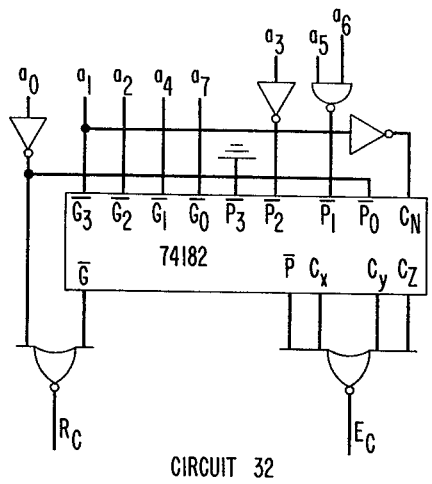

FIGS. 4, 5, and 6 show detailed implementations of the circuits 30–33. From Table I, it can be seen that the outputs of circuits 30 and 33 are identical; the outputs shown in columns $R_A$ and $R_D$ are identical. FIG. 4 shows a detailed implementation for circuits 30 and 33. Further, the $R_B$ output of circuit 31 is just the inverse of the $R_A$ output of circuit 30. A detailed implementation of circuit 31 is shown in FIG. 5. It is identical to the circuit of FIG. 4, except for the absence of the inverter circuit on output lead $R_B$. FIG. 6 shows a detailed implementation of circuit 32.

The logical operations that result in the outputs $E_A$–$E_C$ and $R_A$–$R_D$ as a function of the inputs $a_0$–$a_7$ can be written in Boolean equation form after a consideration of the information in the truth table above:

$$R_A = R_D = \overline{a_0} + \overline{a_3}a_2a_1 + \overline{a_5}a_4a_2a_1 + \overline{a_6}a_4a_2a_1 \tag{1}$$

$$R_B = \overline{R}_A \tag{2}$$

$$R_C = \overline{a_1}a_0 + \overline{a_2}a_0 + \overline{a_4}a_3a_0 + \overline{a_7}a_6a_5a_3a_0 \tag{3}$$

$$E_A = E_B = E_C = a_7a_6a_5a_4a_3a_2a_1a_0 \tag{4}$$

It is convenient to implement these equations using the 74182 look-ahead carry generator circuit described in the Signetics manual at p. 183. The equations implemented by the 74182 are as follows:

$$C_X = G_0 + P_0 C_N \tag{5}$$

$$C_Y = G_1 + P_1 G_0 + P_1 P_0 C_N \tag{6}$$

$$C_Z = G_2 + P_2 G_1 + P_2 P_1 G_0 + P_2 P_1 P_0 C_N \tag{7}$$

$$\overline{G} = \overline{G_3 + P_3 G_2 + P_3 P_2 G_1 + P_3 P_2 P_1 G_0} \tag{8}$$

$$\overline{P} = \overline{P_3 P_2 P_1 P_0} \tag{9}$$

Note that the above equations are derived assuming an active-low convention for all G and P inputs and outputs and an active-high convention for C inputs and outputs.

It can be verified that the circuits of FIGS. 4, 5, and 6 implement the equations (1)–(4) by substituting into the appropriate equations (5)–(9) with the variables shown at the inputs in the respective circuits. $R_A$, for example, is derived from the $\overline{G}$ output of the 74182 of FIG. 4, where $\overline{C_3} = a_0$, $\overline{P_3} = \overline{a_1 a_2}$, $\overline{P_1} = 0$, and so forth. The equation for $R_A$ is derived as follows:

$$\begin{aligned}
R_A &= G \\
&= G_3 + P_3 G_2 + P_3 P_2 G_1 + P_3 P_2 P_1 G_0 \\
&= \overline{a_0} + (a_1 \cdot a_2)\overline{a_3} + (a_1 \cdot a_2)a_4 \overline{a_5} + (a_1 \cdot a_2)a_4 \overline{a_6} \\
&= \overline{a_0} + a_1 a_2 \overline{a_3} + a_1 a_2 a_4 \overline{a_5} + a_1 a_2 a_4 \overline{a_6}
\end{aligned} \tag{10}$$

Output $R_C$ is derived from the $\overline{G}$ output of FIG. 6 as follows:

$$G = G_3 + P_3 G_2 + P_3 P_2 G_1 + P_3 P_2 P_1 G_0 \tag{11}$$

$$= \overline{a_1} + \overline{a_2} + a_3 \overline{a_4} + a_3 a_5 a_6 \overline{a_7}$$

$$R_C = \overline{\overline{G} + \overline{a_0}} \tag{12}$$

$$= a_0 \cdot G$$

$$= a_0 \overline{a_1} + a_0 \overline{a_2} + a_0 a_3 \overline{a_4} + a_0 a_3 a_5 a_6 \overline{a_7}$$

Outputs $E_A$ and $E_C$ are derived from the C and $\overline{P}$ outputs of FIGS. 4 and 6 by first simplifying the NOR function as follows using the Boolean identities $A + AB = A$ and $A + \overline{A}B = A + B$.

$$C_X + C_Y + C_Z = G_0 + G_1 + G_2 + P_0 C_N \tag{13}$$

$$\begin{aligned}
E_A &= \overline{\overline{P} + C_x + C_y + C_z} \\
&= \overline{\overline{P_3 P_2 P_1 P_0} + G_0 + G_1 + G_2 + P_0 C_N} \\
&= \overline{\overline{P_3} + \overline{P_2} + \overline{P_1} + \overline{P_0} + G_0 + G_1 + G_2 + C_N} \\
&= P_3 P_2 P_1 P_0 \overline{G_0}\, \overline{G_1}\, \overline{G_2}\, \overline{C_N}
\end{aligned} \tag{14}$$

Substituting for the inputs shown in FIG. 4:

$$E_A = (a_1 \cdot a_2) \cdot a_4 \cdot 1 \cdot a_7 \cdot a_6 \cdot a_5 \cdot a_3 \cdot a_0 \tag{15}$$

Substituting for the input shown in FIG. 6:

$$E_C = 1 \cdot a_3 \cdot (a_5 \cdot a_6) \cdot a_0 \cdot a_7 \cdot a_4 \cdot a_2 \cdot a_1 \tag{16}$$

Throughout the description of the above embodiment, a 32-bit input bus was assumed, subdivided for purposes of the present illustration into four 8-bit bytes. It will be understood that the present invention may be implemented with other convenient byte sizes and numbers of bytes. For example, for a 32-bit data bus, the invention may be implemented with two 16-bit bytes, four 8-bit bytes, eight 4-bit bytes, and so forth, without departing from the teaching herein. Similarly, a 64-bit data byte may be implemented with two 32-bit bytes, four 16-bit bytes, and so forth, without departing from the spirit of the invention.

Figure 7:
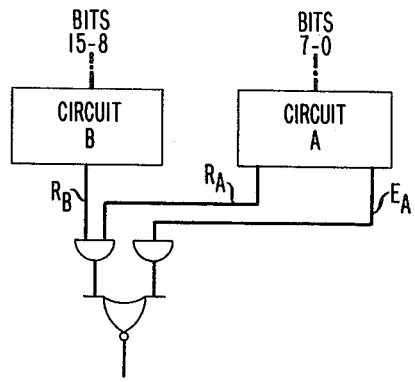
FIG. 7 is an illustrative embodiment of the present invention for a 16-bit input word divided into two 8-bit bytes.

As an example, FIG. 7 illustrates an embodiment of the present invention for a 16-bit data bus divided into two 8-bit bytes. Its design and operation will be evident from the previous description.

What is claimed is:

1. Apparatus for generating an overall parity indication for a positional address of the lowest order zero appearing on a plurality of inputs, said apparatus comprising means responsive to signal states on a first plurality of the inputs for generating at least a first result bit having a state representing parity of the positional address of a lowest order zero appearing in said first plurality of the inputs and at least a first activity bit having a state indicating whether said first plurality of inputs has a lowest order zero appearing therein, means responsive to a second plurality of inputs for generating at least a second result bit having a state representing parity of the positional address with respect to all of the inputs of a lowest order zero appearing in said second plurality of the inputs, and means responsive to at least said first activity bit for selecting the state of either said first result bit or said second result bit as the overall parity indication.

2. Apparatus comprising first means responsive to signals of a first byte of an input data word for generating a control signal and a first parity signal for the address of a low order zero appearing in the first byte, second means responsive to signals of a second byte of the input data word for generating a second parity signal for the address of a low order zero appearing in the second byte, and means responsive to said control signal for selecting said first or said second parity signal.

3. The invention of claim 2 wherein the first generating means further comprises means for generating first and second states of the control signal if the first byte contains respectively, none or at least one zero.

4. Apparatus comprising first means responsive to signals of a first byte of an input data word for generating a first control signal and a first parity signal for the address of a low order zero appearing in the first byte, second means responsive to signals of a second byte of the input data word for generating a second control signal and a second parity signal for the address of a low order zero appearing in the second byte, and means responsive to said first and second control signals for selecting said first or said second parity signal.

5. Apparatus as set forth in claim 4 wherein the first generating means further comprises means for controlling the state of said first control signal to indicate whether or not said first byte contains a low order zero, and the second generating means further comprises means for controlling the state of said second control signal to indicate whether or not said second byte contains a low order zero.

6. Apparatus as set forth in claims 2, 8, 4, or 5 wherein the means for generating the first parity signal further comprises means for generating the true parity for the address of the low order zero appearing in said first byte, and the means for generating the second parity signal further comprises means for generating the inverse parity for the address of the low order zero appearing in said second byte.

7. Apparatus as set forth in claims 2, 3, 4, or 5 in which each of the means for generating the first and second parity signals further comprises means for generating respective first and second byte address parity signals according to the position within the respective bytes of a low order zero, and means for changing the state of the byte address parity signals in accordance with the position of the respective bytes in the data word to represent the true parity of the low order zero in the data word.

8. Apparatus for generating a first parity indication for an address signifying the position of a signal of a prescribed binary state appearing in a least significant position on a contiguous set of ordered inputs, said apparatus comprising plural circuit means, each responsive to binary signals on a different set of contiguous ones of the inputs for generating a second parity indication for the address of the least significant one of its inputs having a signal of said prescribed state and taking into account the position of its set of contiguous inputs with respect to the remaining ones of the inputs, each of the circuit means being further responsive to the signals on its set of inputs for generating a third indication if none of its inputs contains a signal of said prescribed state, and means responsive to the second parity indications and to the third indications from each of the circuit means for generating the first parity indication.

* * * * *

UNITED STATES PATENT AND TRADEMARK OFFICE
CERTIFICATE OF CORRECTION

PATENT NO. : 4,443,876
DATED : April 17, 1984
INVENTOR(S) : Ying-Wah Ng

It is certified that error appears in the above—identified patent and that said Letters Patent is hereby corrected as shown below:

In the Detailed Description, column 5, line 23, that portion of the formula reading $\overline{C}_3 = a_0$ should read $\overline{G}_3 = a_0$ Column 5, line 48, that portion of the formula reading A+AB=A+B. should read A+$\overline{A}$B=A+B.

*Signed and Sealed this*

*Thirtieth* Day of *October 1984*

[SEAL]

*Attest:*

*Attesting Officer*

GERALD J. MOSSINGHOFF
*Commissioner of Patents and Trademarks*